US012355152B2

(12) United States Patent
Sowpati et al.

(10) Patent No.: US 12,355,152 B2
(45) Date of Patent: Jul. 8, 2025

(54) CAVITY-BACKED SLOT ANTENNA AND ELECTRONIC DEVICE COMPRISING THE SLOT ANTENNA

(71) Applicants: Arun Sowpati, Kista (SE); Huawei Technologies Co., Ltd., Shenzhen (CN)

(72) Inventors: Arun Sowpati, Kista (SE); Antti Karilainen, Kista (SE); Joonas Krogerus, Helsinki (FI); Zlatoljub Milosavljevic, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 17/770,222

(22) PCT Filed: Oct. 22, 2019

(86) PCT No.: PCT/EP2019/078639

§ 371 (c)(1),
(2) Date: Apr. 19, 2022

(87) PCT Pub. No.: WO2021/078365

PCT Pub. Date: Apr. 29, 2021

(65) Prior Publication Data

US 2022/0399650 A1 Dec. 15, 2022

(51) Int. Cl.
*H01Q 13/18* (2006.01)
*H01Q 1/24* (2006.01)

(52) U.S. Cl.
CPC .............. *H01Q 13/18* (2013.01); *H01Q 1/243* (2013.01)

(58) Field of Classification Search
CPC .......... H01Q 1/24; H01Q 13/18; H01Q 1/243; H01Q 1/2266
See application file for complete search history.

(56) References Cited

U.S. PATENT DOCUMENTS 6,618,020 B2 9/2003 Wang et al.
6,636,183 B1 10/2003 Hellgren et al.
8,077,096 B2 12/2011 Chiang et al.
8,373,601 B2 2/2013 Wu et al.
(Continued)

FOREIGN PATENT DOCUMENTS

EP 0989627 A1 3/2000
WO 2019120515 A1 6/2019
(Continued)

OTHER PUBLICATIONS

Sumin Yun, et al., "Bandwidth Enhancement of Cavity-Backed Slot Antenna Using a via-Hole above the Slot," IEEE Antennas and Wireless Propagation Letters, vol. 11, 2012, 4 pages.

*Primary Examiner* — Dimary S Lopez Cruz
*Assistant Examiner* — Aladdin Abdulbaki
(74) *Attorney, Agent, or Firm* — Conley Rose, P.C.

(57) ABSTRACT

A cavity-backed slot antenna for an electronic device comprises a first conductive structure and a second conductive structure. A dielectric slot extends between the first conductive structure and the second conductive structure. A third conductive structure extends from the first conductive structure and is juxtaposed with the dielectric slot. A dielectric volume is partially enclosed by the first conductive structure, the second conductive structure, and the third conductive structure, and the dielectric volume comprises the dielectric slot.

21 Claims, 4 Drawing Sheets

(56) References Cited

U.S. PATENT DOCUMENTS

| | | | | |
|---|---|---|---|---|
| 9,583,838 | B2 | 2/2017 | Zhu et al. | |
| 10,164,679 | B1 | 12/2018 | Rajagopalan et al. | |
| 10,320,069 | B2 * | 6/2019 | Zhou | H01Q 1/20 |
| 2016/0182112 | A1 * | 6/2016 | Kim | H04B 1/3888 455/572 |
| 2018/0301789 | A1 * | 10/2018 | Lee | H01Q 1/243 |
| 2019/0081387 | A1 * | 3/2019 | Pandya | H04L 69/18 |
| 2020/0194870 | A1 * | 6/2020 | Yamamoto | G06F 1/1656 |
| 2021/0075090 | A1 * | 3/2021 | Yarga | H01Q 1/241 |

FOREIGN PATENT DOCUMENTS

| | | | | |
|---|---|---|---|---|
| WO | WO-2019154501 | A1 * | 8/2019 | H01Q 1/243 |
| WO | 2020151807 | A1 | 7/2020 | |

* cited by examiner

CAVITY-BACKED SLOT ANTENNA AND ELECTRONIC DEVICE COMPRISING THE SLOT ANTENNA

CROSS-REFERENCE TO RELATED APPLICATIONS

This is a U.S. National Stage of International Patent Application No. PCT/EP2019/078639 filed on Oct. 22, 2019, which is hereby incorporated by reference in its entirety.

TECHNICAL FIELD

The disclosure relates to a cavity-backed slot antenna comprising a first conductive structure, a second conductive structure, and a dielectric slot extending between the first conductive structure and the second conductive structure, as well as an electronic device comprising the slot antenna.

BACKGROUND

Conventionally, the antennas of an electronic device are arranged next to the display, such that the display does not interfere with the efficiency and frequency bandwidth of the antenna. However, the movement towards very large displays, covering as much as possible of the electronic device, makes the space available for the antennas very limited, forcing either the size of the antennas to be significantly reduced, and its performance impaired, or a large part of the display to be inactive.

Furthermore, electronic devices need to support more and more radio signal technology such as 2G/3G/4G radio. For coming 5G radio technology, high throughput is a one of the properties which need to be fulfilled, requiring large bandwidths, Multiple Input Multiple Output (MIMO), and efficient modulation schemes. The frequency bands will be expanded to cover frequencies up to 6 GHz, thus requiring the addition of a number of new wide-band antennas in addition to the existing antennas. Millimeter wave antenna systems are required for gigabit-level bandwidths, but the operation distance is limited when compared to sub-6-gigahertz radio systems.

Putting these challenges together, wide-band antennas with frequency bandwidth of more than 1 GHz and which can be located over the display or other conductive structural parts are necessary. Moreover, the length of the antennas should in the vicinity of half wavelengths of the lowest resonance frequency in free space, due to the need for at least four MIMO antennas, and much smaller in other directions.

SUMMARY

It is an object to provide an improved antenna structure. The foregoing and other objects are achieved by the features of the independent claims. Further implementation forms are apparent from the dependent claims, the description, and the figures.

According to a first aspect, there is provided a cavity-backed slot antenna for an electronic device, the cavity-backed slot antenna comprising a first conductive structure and a second conductive structure, a dielectric slot extending between the first conductive structure and the second conductive structure, a third conductive structure extending from the first conductive structure and being juxtaposed with the dielectric slot, the slot antenna further comprising a dielectric volume at least partially enclosed by the first conductive structure, the second conductive structure, and the third conductive structure, the dielectric volume comprising the dielectric slot.

Such a slot antenna is, due to its longitudinal shape, very flexible and can be easily integrated in an electronic device or any other device with similar space requirements, while still having a wide band covering necessary 5G frequency bands. The slot antenna can be placed in the free volume along the long sides of the electronic device and be formed with the help of other, existing components.

In a possible implementation form of the first aspect, the cavity-backed slot antenna further comprises a fourth conductive structure extending from the first conductive structure to the second conductive structure.

In a further possible implementation form of the first aspect, the third conductive structure is conductively connected to the first conductive structure by means of at least one of a conductive gasket and conductive adhesive, effectively increasing the antenna aperture size which boosts antenna performance in terms of radiation efficiency and electrical field strength.

In a further possible implementation form of the first aspect, the cavity-backed slot antenna further comprises an antenna feed structure and a ground connection extending between the first conductive structure and the second conductive structure through the dielectric volume, facilitating placement of the antenna feed structure in such a way that the reference ground is connected to surrounding conductive surfaces.

In a further possible implementation form of the first aspect, the dielectric slot extends, in a longitudinal direction, between a first slot end and a second slot end, the dielectric slot has at least a first dimension and a second dimension in a first transverse direction extending perpendicular to the longitudinal direction, the first dimension being smaller than the second dimension, at least one of the first slot end and the second slot end having the second dimension in the first transverse direction. This facilitates tuning the resonance frequency downwards and improves the impedance matching of resonance frequencies.

In a further possible implementation form of the first aspect, the dielectric slot comprises a first dielectric widening arranged at the first slot end, the first dielectric widening extending in a second transverse direction perpendicular to the longitudinal direction and to the first transverse direction, and/or the dielectric slot comprises a second dielectric widening arranged at the second slot end, the second dielectric widening extending in a second transverse direction perpendicular to the longitudinal direction and to the first transverse direction, facilitating an as small slot antenna as possible, allowing the size and the available bandwidths of the antenna to be weighed against each other in order to achieve a specific solution.

In a further possible implementation form of the first aspect, the dielectric slot extends substantially in a first plane comprising the longitudinal direction and the first transverse direction, the first dielectric widening and the second dielectric widening extending substantially in a second plane comprising the longitudinal direction and the second transverse direction, the first plane extending substantially in parallel with the third conductive structure.

In a further possible implementation form of the first aspect, the third conductive structure comprises at least one slit extending through a main plane of the third conductive structure.

In a further possible implementation form of the first aspect, the dielectric slot is separated by a predefined distance from the third conductive structure.

In a further possible implementation form of the first aspect, the second conductive structure divides the dielectric volume into two interconnected dielectric sub-sections juxtaposed with each other and with the third conductive structure.

According to a second aspect, there is provided an electronic device comprising a plurality of electronic components, a display, a frame, a back cover, at least one cavity-backed slot antenna according to the above, and, optionally, an outer protective layer covering the display, the display, the frame, and the back cover enclosing the electronic components and the cavity-backed slot antenna, the first conductive structure of the cavity-backed slot antenna comprising the frame, the second conductive structure of the cavity-backed slot antenna separating the dielectric volume from a first electronic component.

The electronic device may have a large display, while still having a wide band covering necessary 5G frequency bands. The slot antenna provides the needed resonance frequencies for wide-band operation. As the slot antenna is formed by means of other, existing components, the slot antenna is not only spatially efficient but can be arranged in juxtaposition with the display, i.e. on-ground.

In a possible implementation form of the second aspect, the dielectric volume of the cavity-backed slot antenna is enclosed by the frame, the second conductive structure, the third conductive structure and, optionally, the fourth conductive structure of the cavity-backed slot antenna, and one of the display and the back cover, allowing the cavity-backed slot antenna to be formed, in part, by means of a gap between two components.

In a further possible implementation form of the second aspect, the dielectric slot of the cavity-backed slot antenna faces the third conductive structure, and the first dielectric widening and the second dielectric widening of the cavity-backed slot antenna face the first electronic component.

In a further possible implementation form of the second aspect, the first electronic component is a battery, increasing the mechanical robustness of in particular thin electronic devices by placing the slot antenna in a close proximity to sturdy, structural components such as batteries.

In a further possible implementation form of the second aspect, the main plane of the third conductive structure extends substantially in parallel with a main plane of the back cover and/or a main plane of the display, providing a third conductive structure which is in complete conformance with surrounding surfaces and components.

In a further possible implementation form of the second aspect, the third conductive structure covers only a part of the dielectric slot, leaving a dielectric space interconnecting the dielectric volume and the display or the back cover.

In a further possible implementation form of the second aspect, the third conductive structure abuts a surface of one of the back cover and the outer protective cover, the surface facing the dielectric volume.

In a further possible implementation form of the second aspect, the third conductive structure is one of printed, laminated, or adhered onto the surface, facilitating a third conductive structure which takes up very little space.

In a further possible implementation form of the second aspect, the dielectric slot extends closer to the frame than the first electronic component in the first transverse direction.

In a further possible implementation form of the second aspect, the longitudinal direction of the dielectric slot is parallel with a long side of the electronic device, the essentially longitudinal shape of the slot antenna allowing one or several slot antennas to take up as much space longitudinally as possible and necessary, while taking up as little space as possible in the other directions.

In a further possible implementation form of the second aspect, the electronic device further comprises a ground connection extending between the first conductive structure and the display through the dielectric volume.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 1:
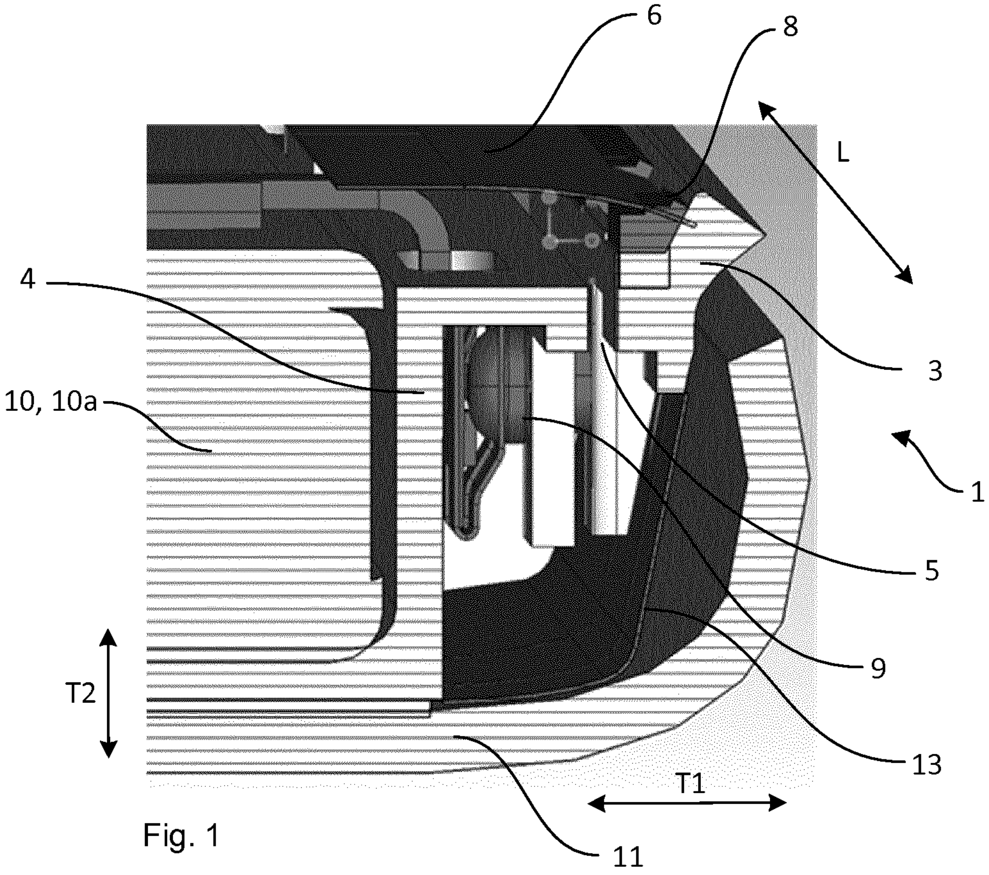
FIG. 1 shows a partial cross-sectional view of an electronic device and a cavity backed slot antenna in accordance with an embodiment of the present disclosure.

The present disclosure relates to a cavity-backed slot antenna 1 for an electronic device 2, as shown in FIGS. 1 and 2. The cavity-backed slot antenna 1 comprises a first conductive structure 3 and a second conductive structure 4, and a dielectric slot 5 extends between the first conductive structure 3 and the second conductive structure 4.

A third conductive structure 6 extends from the first conductive structure 3 and is juxtaposed with the dielectric slot 5. The third conductive structure 6 may be conductively connected to the first conductive structure 3 by means of at least one of a conductive gasket 8 and conductive adhesive. From this connection, the third conductive structure 6 protrudes from the first conductive structure 3 and extends, at a predefined distance from the dielectric slot 5, such that it at least partially covers the dielectric slot 5. The third conductive structure 6 may comprise of a conductive gasket, conductive adhesive, or similar, or be made in the form of a flexible printed circuit (FPC) or foil. It can furthermore be made on a plastic carrier or frame inside of the electronic device 2 by for example Laser Direct Structuring (LDS) technology, printing, or any other suitable way.

The slot antenna 1 further comprises a dielectric volume 7 at least partially enclosed by the first conductive structure 3, the second conductive structure 4, and the third conductive structure 6, which together form a hollow assembly. The dielectric volume 7 comprising the dielectric slot 5. The dielectric volume 7 may comprise a dielectric substrate, e.g. made of plastic. The distance between the first conductive structure 3 and the second conductive structure 4, i.e. the clearance between these two conductive components, may be e.g. between 2-3 mm, preferably 2.5 mm. Nevertheless, the distance may be both larger and smaller than that. This distance may correspond to the maximum width of the dielectric volume 7.

As shown in FIGS. 1 and 2, the first conductive structure 3 may comprise a conductive extension extending from the first conductive structure 3 to the second conductive structure 4. The cavity-backed slot antenna 1 may instead comprise a separate fourth conductive structure 13 extending from the first conductive structure 3 to the second conductive structure 4, such that the fourth conductive structure 13 is part of the hollow assembly. The fourth conductive structure 13 may comprise a conductive sheet, such as a metal sheet, or a surface made by, e.g., printing or plating a dielectric on what is an inside of the hollow assembly enclosing the dielectric volume 7.

The cavity-backed slot antenna 1 may further comprise an antenna feed structure and a ground connection 9, such as a feed rivet and a ground rivet, extending between the first conductive structure 3 and the second conductive structure 4 through the dielectric volume 7, as indicated in FIG. 1.

Figure 3:
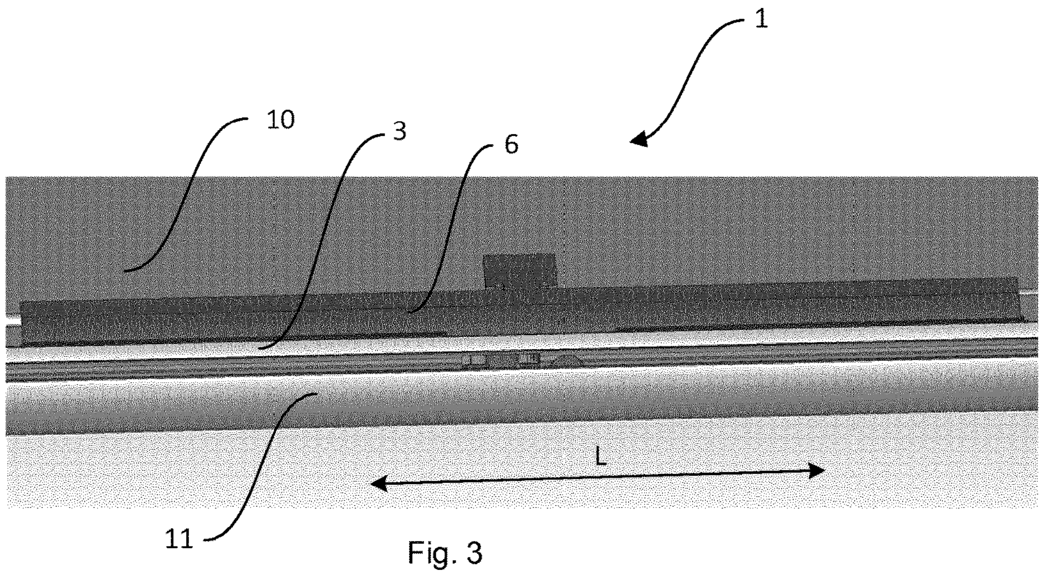
FIG. 3 shows a partial perspective view of a cavity backed slot antenna in accordance with an embodiment of the present disclosure.
Figure 4:
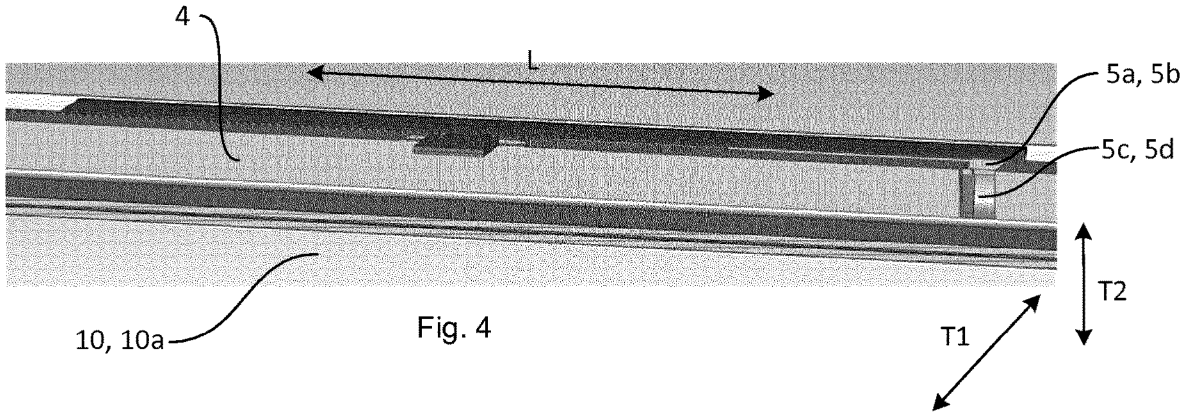
FIG. 4 shows a further partial perspective view of a cavity backed slot antenna in accordance with an embodiment of the present disclosure.
Figure 5:
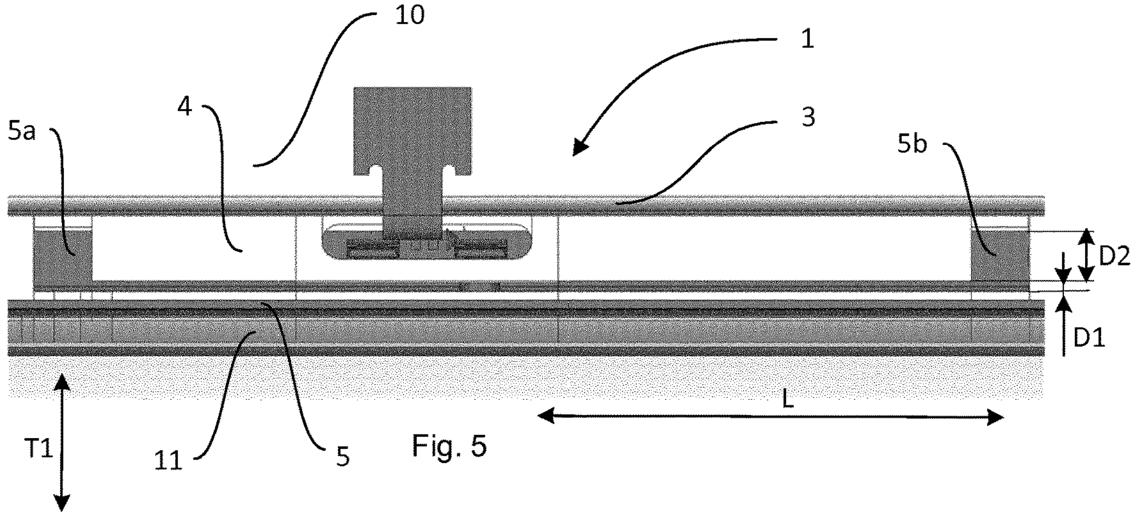
FIG. 5 shows a further partial perspective view of a cavity backed slot antenna in accordance with an embodiment of the present disclosure.

The dielectric slot 5 may extend, as shown in FIGS. 3 to 5, in a longitudinal direction L between a first slot end 5*a* and a second slot end 5*b*. The longitudinal direction L corresponds to the direction in which the long sides of the electronic device 2 extend, i.e. the height of the electronic device 2. The width of the third conductive structure 6, in the longitudinal direction L, is substantially the same as the length of the dielectric slot 5 in longitudinal direction L.

The dielectric slot 5 has at least a first dimension D1 and a second dimension D2 in a first transverse direction T1 extending perpendicular to the longitudinal direction L, i.e. at least one dimension of the dielectric slot 5 is non-homogenous. The first transverse direction T1 corresponds to the direction in which the short sides of the electronic device 2 extend, i.e. the width of the electronic device 2. The first dimension D1 is smaller than the second dimension D2, such that the dielectric slot 5 is stepped at least once in the first transverse direction T1. One, or both, of the first slot end 5*a* and the second slot end 5*b* have the second dimension D2 in the first transverse direction T1.

The dielectric slot 5 may comprise a first dielectric widening 5*c*, as shown in FIG. 4, arranged at the first slot end 5*a*, which first dielectric widening 5*c* extends in a second transverse direction T2 perpendicular to the longitudinal direction L and to the first transverse direction T1. The second transverse direction T2 corresponds to the thickness of the electronic device 2.

The dielectric slot 5 may further comprise a second dielectric widening 5*d* arranged at the second slot end 5*b*, the second dielectric widening 5*d* also extending in the second transverse direction T2.

The dielectric slot 5 extends substantially in a first plane comprising the longitudinal direction L and the first transverse direction T1. The first dielectric widening 5*c* and the second dielectric widening 5*d* extend substantially in a second plane comprising the longitudinal direction L and the second transverse direction T2. The first plane extends substantially in parallel with a main plane of the third conductive structure 6.

Figure 6A:
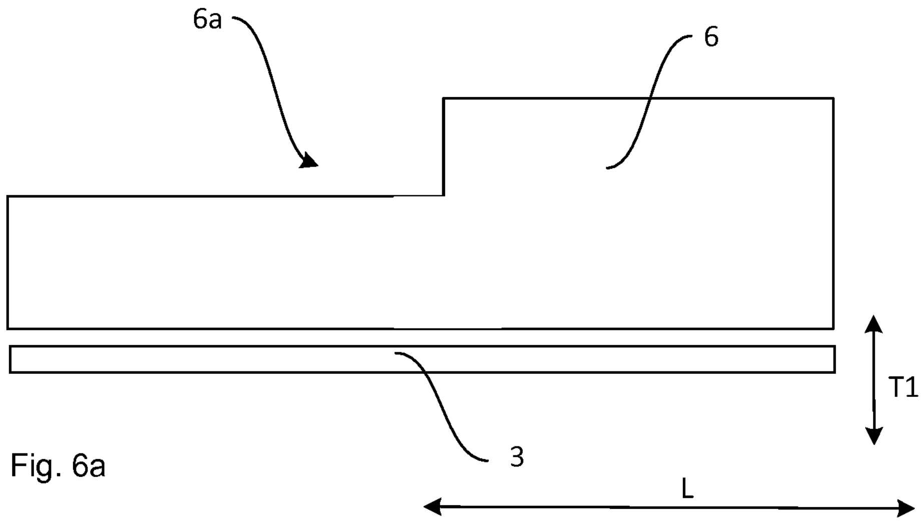
FIG. 6*a* shows a schematic top view of two conductive structures of the cavity backed slot antenna in accordance with an embodiment of the present disclosure.
Figure 6B:
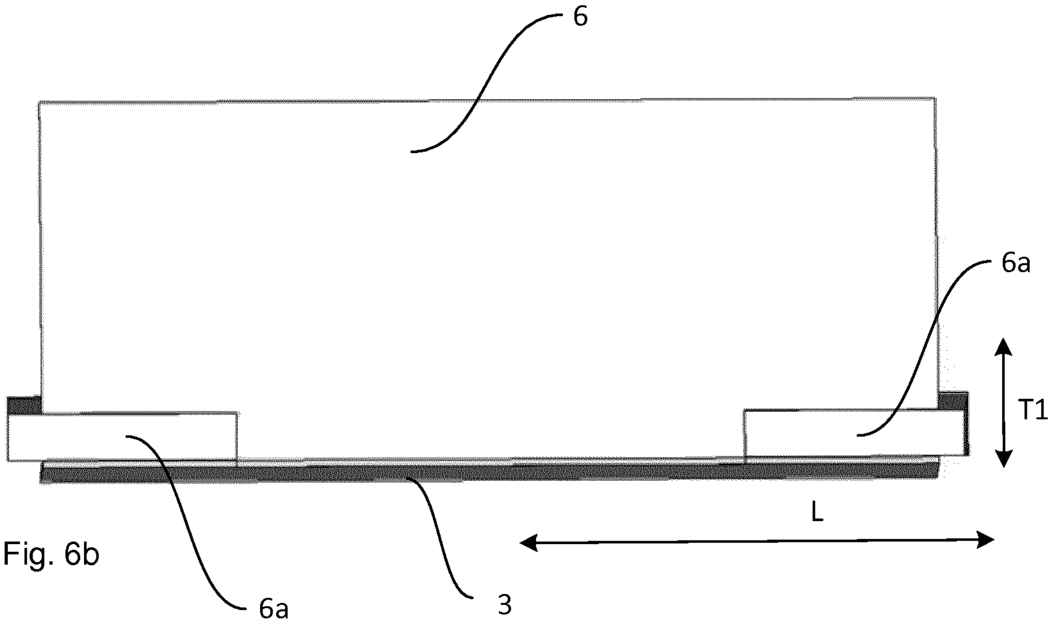
FIG. 6*b* shows a schematic top view of two conductive structures of the cavity backed slot antenna in accordance with a further embodiment of the present disclosure.

As shown in FIGS. 6*a* and 6*b*, the third conductive structure 6 may comprise at least one slit 6*a* extending through the main plane of the third conductive structure 6, i.e. through the conductive structure in the second transverse direction T2 such that a throughgoing opening is formed in the third conductive structure 6.

FIG. 6*a* shows one slit 6*a* extending along an edge of the third conductive structure 6, such that the third conductive structure 6 is stepped once in in the first transverse direction T1. Hence, a section of the third conductive structure 6 has smaller outer dimensions than the rest of the third conductive structure 6. In FIG. 6*a*, this section is arranged along the edge which is the farthest from the first conductive structure, i.e. closest to the second conductive structure 4.

FIG. 6*b* shows two slits 6*a* extending along a total of three edges of the third conductive structure 6, such that the third conductive structure 6 is stepped twice in in the first transverse direction T1. Hence, two sections of the third conductive structure 6 have smaller outer dimensions than the rest of the third conductive structure 6. In FIG. 6*b*, these sections are arranged partially along the edge which is the closest to the first conductive structure, i.e. farthest from the second conductive structure 4.

Figure 2A:
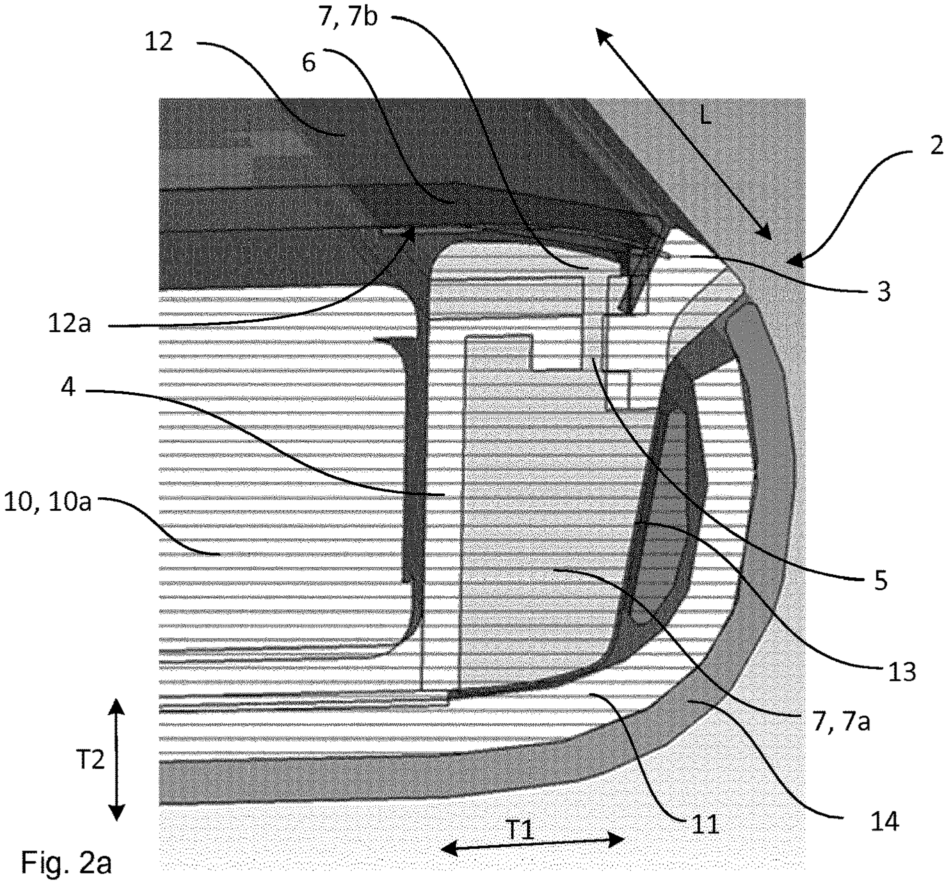
FIG. 2*a* shows a further partial cross-sectional view of an electronic device and a cavity backed slot antenna in accordance with an embodiment of the present disclosure.
Figure 2B:
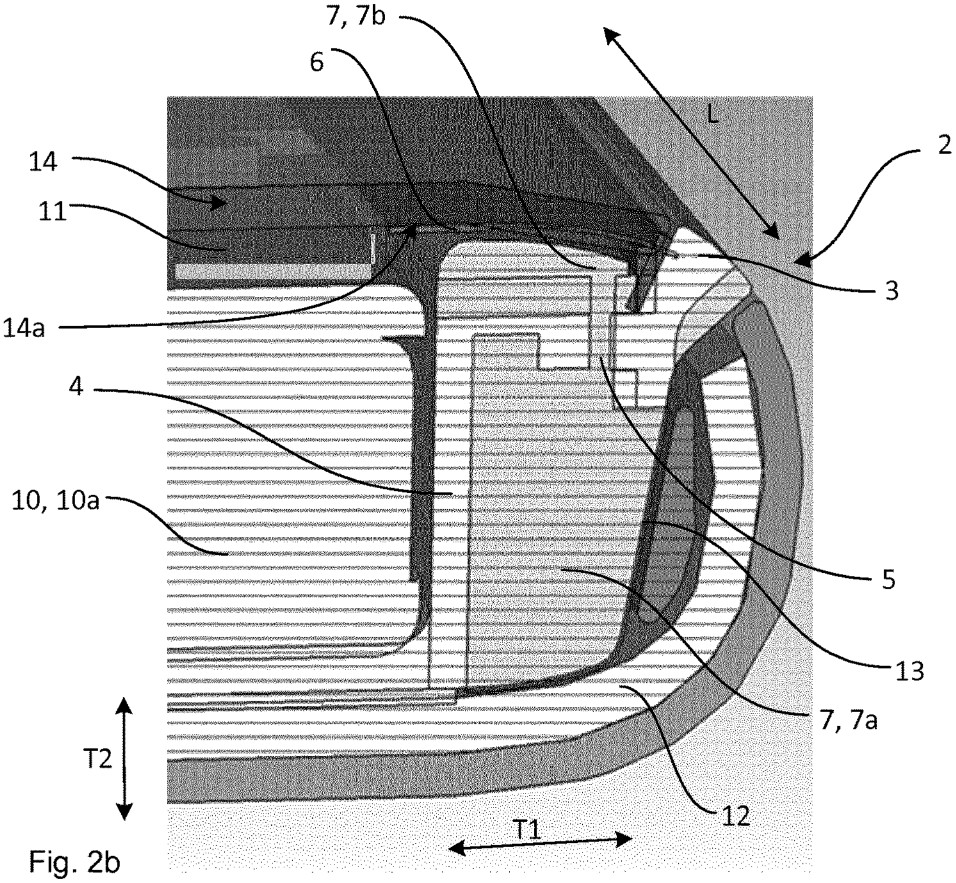
FIG. 2*b* shows a further partial cross-sectional view of an electronic device and a cavity backed slot antenna in accordance with an embodiment of the present disclosure.

The second conductive structure 4 may divide the dielectric volume 7 into two interconnected dielectric sub-sections 7*a*, 7*b* juxtaposed with each other and with the third conductive structure 6, as shown in FIGS. 2*a* and 2*b*. Dielectric sub-section 7*a* may be arranged adjacent the third conductive structure 6 and dielectric sub-section 7*b* adjacent the display 11. Contrarily, dielectric sub-section 7*b* may be arranged adjacent the third conductive structure 6 and dielectric sub-section 7*a* adjacent the display 11 (not shown). The interconnection of the two dielectric sub-sections 7*a*, 7*b* may be formed by the dielectric slot 5.

The present disclosure further relates to an electronic device 2 comprising at least a plurality of electronic components 10, the display 11, a frame, a back cover 12, and at least one cavity-backed slot antenna 1 as described above. The display 11, the frame, and the back cover 12 enclose the electronic components 10 and the cavity-backed slot antenna 1. The frame may be a solid metal frame, which does not comprise any recesses or throughgoing openings on account of the function of the slot antenna 1.

The first conductive structure 3 of the cavity-backed slot antenna 1 comprises the frame, and the second conductive structure 4 of the cavity-backed slot antenna 1 separates the dielectric volume 7 from a first electronic component 10*a*. The first electronic component 10*a* may be a battery.

The electronic device 2 may further comprise a ground connection, e.g. a flex circuit, extending between the first conductive structure 3 and the display 11 through the dielectric volume 7.

The dielectric volume 7 of the cavity-backed slot antenna 1 may be enclosed by the first conductive structure/frame 3, the second conductive structure 4, the third conductive structure 6 of the cavity-backed slot antenna 1, and one of the display 11 and the back cover 12. The display 11 is preferably covered by a further outer protective layer 14 such as a glass cover.

FIG. 2*a* shows an embodiment wherein the dielectric volume 7 is enclosed by the first conductive structure/frame 3, the second conductive structure 4, the third conductive structure 6 of the cavity-backed slot antenna 1, and the display 11.

FIG. 2*b* shows an embodiment wherein the dielectric volume 7 is enclosed by the first conductive structure/frame 3, the second conductive structure 4, the third conductive structure 6 of the cavity-backed slot antenna 1, and the back cover 12. If the back cover 12 comprises metal, there is no need for a further outer layer, which is suggested in FIG. 2*b*.

The main plane of the third conductive structure 6 may extend substantially in parallel with a main plane of the back cover 12 and/or a main plane of the display 11, as shown in FIGS. 1, 2*a*, and 2*b*. The third conductive structure 6 may abut the surface 12*a* of the back cover 12 or the surface 14*a* of the outer protective layer 14, the surface 12*a*, 14*a* facing the dielectric volume 7. The third conductive structure 6 is preferably one of printed, laminated, or adhered onto the surface 12*a*, 14*a*. The surface 12*a*, 14*a* may comprise a gasket or a conductive sheet such as a metal sheet.

The longitudinal direction L of the dielectric slot 5 is parallel with a long side of the electronic device 2. The dielectric slot 5 of the cavity-backed slot antenna 1 may extend such that it faces the third conductive structure 6, as shown in FIGS. 1, 2*a*, and 2*b*, and the first dielectric widening 5*c* and the second dielectric widening 5*d* face the first electronic component 10*a*, as shown in FIG. 4.

The dielectric slot 5 may extend closer to the frame/first conductive structure 3 than the first electronic component 10*a* in the first transverse direction T1, as shown in FIGS. 1 and 2.

The third conductive structure 6 may cover only a part of the dielectric slot 5, leaving a dielectric space interconnecting the dielectric volume 7, preferably sub-section 7*a*, and the back cover 12 (not shown). The dielectric space may also interconnect the dielectric volume 7, preferably sub-section 7*b*, and the display 11 (not shown).

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

The invention claimed is:

1. A slot antenna comprising:

a first conductive structure comprising a first surface;

a second conductive structure comprising a second surface;

a dielectric slot extending between the first surface of the first conductive structure and the second surface of the second conductive structure;

a third conductive structure positioned at a first side of the first conductive structure and the second conductive structure, extending from the first conductive structure, and juxtaposed with the dielectric slot, wherein the dielectric slot comprises a first dielectric widening arranged at a first end of the dielectric slot and a second dielectric widening arranged at a second end of the dielectric slot;

a fourth conductive structure positioned at a second side of the first conductive structure and the second conductive structure and extending from the first conductive structure to the second conductive structure, wherein the fourth conductive structure comprises a first end coupled to the first conductive structure and a second end coupled to the second conductive structure, and wherein the fourth conductive structure is at least partially curved between the first end and the second end;

a conductive gasket coupling the third conductive structure with the first conductive structure; and a dielectric volume partially enclosed by the first conductive structure, the second conductive structure, the third conductive structure, and the fourth conductive structure and comprising the dielectric slot.

2. The slot antenna of claim 1, further comprising a conductive adhesive conductively coupling the third conductive structure to the first conductive structure.

3. The slot antenna of claim 1, further comprising:

an antenna feed structure extending between the first conductive structure and the second conductive structure through the dielectric volume; and a ground connection extending between the first conductive structure and the second conductive structure through the dielectric volume.

4. The slot antenna of claim 1, wherein the third conductive structure comprises a slit extending through a main plane of the third conductive structure.

5. The slot antenna of claim 1, wherein the dielectric slot is separated by a distance of approximately 2 millimeters (mm) to 3 mm from the third conductive structure.

6. The slot antenna of claim 1, wherein the second conductive structure divides the dielectric volume into two interconnected dielectric sub-sections juxtaposed with each other and with the third conductive structure.

7. The slot antenna of claim 1, wherein the fourth conductive structure comprises a dielectric plated on a surface of a hollow assembly enclosing the dielectric volume.

8. The slot antenna of claim 4, wherein the third conductive structure comprises a second slit along an edge farthest from the first conductive structure.

9. The slot antenna of claim 1, wherein a distance between the first surface of the first conductive structure and the second surface of the second conductive structure is about 2 to 3 millimeters (mm).

10. An electronic device comprising:

a plurality of electronic components;

a display;

a frame;

a back cover;

an outer protective layer covering the display; and a slot antenna comprising:

a first conductive structure comprising a first surface and the frame;

a second conductive structure comprising a second surface;

a dielectric slot extending between the first surface of the first conductive structure and the second surface of the second conductive structure, wherein the dielectric slot comprises a first dielectric widening arranged at a first end of the dielectric slot and a second dielectric widening arranged at a second end of the dielectric slot;

a third conductive structure positioned at a first side of the first conductive structure and the second conductive structure, extending from the first conductive structure, and juxtaposed with the dielectric slot;

a fourth conductive structure positioned at a second side of the first conductive structure and the second conductive structure and extending from the first conductive structure to the second conductive structure, wherein the fourth conductive structure comprises a first end coupled to the first conductive structure and structure, a second end coupled to the second conductive structure, and wherein the fourth conductive structure is at least partially curved between the first end and the second end;

a conductive gasket coupling the third conductive structure with the first conductive structure; and a dielectric volume partially enclosed by the first conductive structure, the second conductive structure, the third conductive structure, and the fourth conductive structure and comprising the dielectric slot, wherein the display, the frame, and the back cover enclose the electronic components and the slot antenna, and wherein the second conductive structure is configured to separate the dielectric volume from a first electronic component.

11. The electronic device of claim 10, wherein the dielectric volume is enclosed by the frame, the second conductive structure, the third conductive structure, the fourth conductive structure, and one of the display or the back cover.

12. The electronic device of claim 10, wherein the third conductive structure comprises a slit extending through a main plane of the third conductive structure.

13. The electronic device of claim 10, wherein the dielectric slot is separated by a distance of approximately 2 millimeters (mm) to 3 mm from the third conductive structure.

14. The electronic device of claim 10, wherein the second conductive structure divides the dielectric volume into two interconnected dielectric sub-sections juxtaposed with each other and with the third conductive structure.

15. The electronic device of claim 10, wherein the first electronic component comprises a battery.

16. The electronic device of claim 10, wherein a first main plane of the third conductive structure extends substantially in parallel with a second main plane of the back cover or a third main plane of the display.

17. The electronic device of claim 16, wherein the third conductive structure covers a portion of the dielectric slot, excluding a dielectric space interconnecting the dielectric volume and either the display or the back cover.

18. The electronic device of claim 10, wherein the third conductive structure abuts a surface of one of the back cover or the outer protective layer, and wherein the surface faces the dielectric volume.

19. The electronic device of claim 18, wherein the third conductive structure is printed, laminated, or adhered onto the surface.

20. The electronic device of claim 10, further comprising a ground connection extending between the first conductive structure and the display through the dielectric volume.

21. An electronic device comprising:

a plurality of electronic components;

a display;

a frame;

a back cover;

an outer protective layer covering the display; and a slot antenna comprising:

a first conductive structure comprising a first surface and the frame;

a second conductive structure comprising a second surface;

a dielectric slot extending between the first surface of the first conductive structure and the second surface of the second conductive structure, wherein the dielectric slot comprises a first dielectric widening arranged at a first end of the dielectric slot and a second dielectric widening arranged at a second end of the dielectric slot;

a third conductive structure positioned at a first side of the first conductive structure and the second conductive structure, extending from the first conductive structure, and juxtaposed with the dielectric slot;

a fourth conductive structure positioned at a second side of the first conductive structure and the second conductive structure and extending from the first conductive structure to the second conductive structure, wherein the fourth conductive structure comprises a first end coupled to the first conductive structure and a second end coupled to the second conductive structure, and wherein the fourth conductive structure is at least partially curved between the first end and the second end;

a conductive gasket coupling the third conductive structure with the first conductive structure; and a dielectric volume partially enclosed by the first conductive structure, the second conductive structure, the third conductive structure, and the fourth conductive structure and comprising the dielectric slot, wherein the display, the frame, and the back cover enclose the electronic components and the slot antenna, wherein the second conductive structure is configured to separate the dielectric volume from a first electronic component; and a ground connection extending between the first conductive structure and the second conductive structure through the dielectric volume, wherein the ground connection is a flexible circuit.

* * * * *